US011677745B2

(12) United States Patent
Sherif et al.

(10) Patent No.: US 11,677,745 B2
(45) Date of Patent: *Jun. 13, 2023

(54) SYSTEMS AND METHODS OF AUTHENTICATION USING VEHICLE DATA

(71) Applicant: CAPITAL ONE SERVICES, LLC., McLean, VA (US)

(72) Inventors: Timur Sherif, Washington, DC (US); Steve Blanchet, Leesburg, VA (US); Hannes Jouhikainen, Mclean, VA (US); Zviad Aznaurashvili, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/861,974

(22) Filed: Apr. 29, 2020

(65) Prior Publication Data

US 2020/0267143 A1    Aug. 20, 2020

Related U.S. Application Data

(63) Continuation of application No. 16/131,131, filed on Sep. 14, 2018, now Pat. No. 10,681,040, which is a
(Continued)

(51) Int. Cl.
*H04L 29/06*      (2006.01)
*H04L 9/40*       (2022.01)
(Continued)

(52) U.S. Cl.
CPC .......... *H04L 63/0853* (2013.01); *G07C 5/008* (2013.01); *H04L 63/0428* (2013.01);
(Continued)

(58) Field of Classification Search
CPC ............ H04L 63/0853; H04L 63/0861; H04L 63/0869; H04L 63/0428; H04L 2463/082; H04L 63/0442; H04L 63/1416; H04L 63/1408; H04L 63/145; H04L 63/1414; H04L 63/1458; H04W 12/06; H04W 4/025; H04W 4/40; H04W 4/023; H04W 12/02;
(Continued)

(56) References Cited

U.S. PATENT DOCUMENTS 7,110,744 B2     9/2006  Freeny, Jr.
7,139,660 B2 *  11/2006  Sarkar ................. B60N 2/0248
                                                         340/426.36
(Continued)

*Primary Examiner* — Abu S Sholeman
(74) *Attorney, Agent, or Firm* — Perkins Coie LLP

(57) ABSTRACT

Multi-factor authentication systems and methods are provided that include receiving a request to authenticate a user of a mobile device. The request for authentication may include credential information associated with the user and vehicle data. A determination may be made regarding whether the vehicle data was obtained from a vehicle via the mobile device. The received vehicle data and received credential information may be compared to stored data. When there is a match between the received vehicle data and received credential information and corresponding stored data, a notification may be provided to the user device, indicating that the user has been authenticated.

20 Claims, 3 Drawing Sheets

Related U.S. Application Data continuation of application No. 16/116,478, filed on Aug. 29, 2018, now Pat. No. 10,498,727.

(51) Int. Cl.
  *H04W 12/06* (2021.01)
  *H04W 4/02* (2018.01)
  *H04W 4/40* (2018.01)
  *G07C 5/00* (2006.01)

(52) U.S. Cl.
  CPC ...... *H04L 63/0861* (2013.01); *H04L 63/0869* (2013.01); *H04W 4/025* (2013.01); *H04W 4/40* (2018.02); *H04W 12/06* (2013.01); *G06F 2221/2111* (2013.01); *H04L 2463/082* (2013.01)

(58) Field of Classification Search
  CPC .. G07C 5/008; G06F 2221/2111; G06F 11/00; G06F 21/56; G06F 21/566; G06F 21/564; G06F 21/562; G06F 21/10; B06W 40/105; B60W 50/14; G11B 20/00086; G11B 20/0021; H04N 21/4405
  See application file for complete search history.

(56) References Cited

U.S. PATENT DOCUMENTS

| | | | |
|---|---|---|---|
| 8,873,807 B2 | 10/2014 | Calman et al. | |
| 8,933,778 B2 | 1/2015 | Birkel et al. | |
| 8,948,698 B2 | 2/2015 | King, II | |
| 9,030,290 B2 | 5/2015 | Keranen et al. | |
| 9,722,781 B2 | 8/2017 | Smereka et al. | |
| 9,783,162 B2* | 10/2017 | Hoyos | B60R 25/25 |
| 9,875,589 B1* | 1/2018 | Buttolo | G07C 9/00571 |
| 10,149,116 B1* | 12/2018 | Kerr | H04W 4/40 |
| 10,853,881 B1* | 12/2020 | LaBarre | G06Q 40/08 |
| 2007/0162550 A1* | 7/2007 | Rosenberg | H04L 51/04 709/206 |
| 2009/0172102 A1* | 7/2009 | Chesnutt | H04L 51/212 709/206 |
| 2010/0114488 A1* | 5/2010 | Khamharn | G01S 5/0072 701/300 |
| 2012/0084440 A1* | 4/2012 | Stahlin | H04L 67/12 709/224 |
| 2012/0230548 A1 | 9/2012 | Calman et al. | |
| 2012/0254960 A1 | 10/2012 | Lortz et al. | |
| 2014/0169634 A1* | 6/2014 | Prakash | H04N 5/44 382/105 |
| 2014/0344718 A1 | 11/2014 | Rapaport et al. | |
| 2015/0137942 A1 | 5/2015 | Suwald et al. | |
| 2015/0356606 A1* | 12/2015 | van Boucq | H04W 4/02 705/14.57 |
| 2016/0012403 A1 | 1/2016 | Kursun et al. | |
| 2016/0013934 A1 | 1/2016 | Smereka et al. | |
| 2016/0197918 A1 | 7/2016 | Turgeman et al. | |
| 2016/0247153 A1* | 8/2016 | Lesesky | G06Q 20/405 |
| 2016/0379486 A1 | 12/2016 | Taylor | |
| 2017/0001649 A1* | 1/2017 | Dickow | H04L 67/12 |
| 2018/0029591 A1* | 2/2018 | Lavoie | B62D 15/027 |
| 2018/0178737 A1 | 6/2018 | Studnicka | |
| 2018/0267904 A1 | 9/2018 | Kurian et al. | |
| 2019/0096021 A1 | 3/2019 | Jarvis et al. | |
| 2021/0334865 A1* | 10/2021 | Irey | G06Q 30/0283 |

* cited by examiner

SYSTEMS AND METHODS OF AUTHENTICATION USING VEHICLE DATA

CROSS-REFERENCE TO RELATED APPLICATIONS

This application is a continuation of U.S. patent application Ser. No. 16/131,131, filed on Sep. 14, 2018, which issued as U.S. Pat. No. 10,681,040, which is a continuation of U.S. patent application Ser. No. 16/116,478, filed on Aug. 29, 2018, which issued as U.S. Pat. No. 10,498,727. The disclosures of the above-referenced applications are expressly incorporated herein by reference in their entireties.

TECHNICAL FIELD

The present disclosure generally relates to systems and methods for multi-factor authentication. More specifically, the present disclosure relates to authenticating a user based on two or more factors where at least one factor is derived from or associated with a vehicle.

BACKGROUND

Authentication of a user requesting access to a system is generally necessary to ensure access is limited only to authorized users. Systems that store personal or confidential information generally require one or more forms of authentication before a user is granted access. Authentication typically involves requiring a user to present evidence that the user is who he or she purports to be. Different types of evidence may be required. The number and/or type of evidence is an authentication "factor." Traditional authentication generally requires a user to present a password before access to a computer system is granted. However, passwords offer only a single piece of evidence (i.e., one factor) of a user's identity. Moreover, data breaches and identity theft often expose this type of data, enabling unauthorized users to acquire credential information necessary to access protected systems without permission.

Multi-factor authentication improves system security requiring users to present two or more factors before access is granted. Multi-factor authentication improves a system's confidence that the user is who he or she purports to be before granting access. Existing methods of multi-factor authentication often require factors that can be categorized as one or more of the following: evidence of something known to the user, evidence of something owned by the user, and/or evidence of something about the user. One example of two-factor authentication requiring data known only to the user may include a password (factor one) and an authentication phrase or challenge question (factor two). A multi-factor authentication example requiring evidence derived from something owned by the user may include requiring a password (factor one) and a security code that is sent to the user's mobile phone and/or obtained by a number-generating security token (factor two). A multi-factor authentication example requiring something about the user may include requiring a password (factor one) and a biometric identifier from the user, such as a fingerprint or facial scan (factor two). An aspect of multi-factor authentication is that it may require the user to present evidence derived from different sources, or evidence provided via separate communication channels. This makes it more difficult for an unauthorized user to acquire necessary authentication information because information is not derived from the same source or provided through the same line of communication. As a result, it becomes more difficult to obtain or intercept the data, and thus reduces instances of successful hacking attempts and unauthorized system access.

In view of existing multi-factor authentication methods, the present disclosure provides new methods and systems for multi-factor authentication that utilize evidence derived from a vehicle that is associated with the user. A vehicle and its associated data form a physical factor (e.g., something owned by the user) that is difficult to obtain or otherwise acquire without authorization. Combined with additional factors during a request for access, such as a password or fingerprint data, data derived from a vehicle improves system security beyond existing methods. Data unique to the vehicle, data unique to the user and associated with the vehicle, evidence of a communication link between the vehicle and user (or system) during authentication, and/or proximity of the user to a vehicle during authentication are examples of some of the vehicle-based evidence of the present disclosure.

Given the prevalence of privately-owned vehicles, their increasing computing power and technology, and the fact vehicles are often in proximity to a user and difficult to acquire (or move without authorization from the user), requiring evidence of data associated with a vehicle improves system security. Data from the vehicle or data associated therewith offers an authentication factor derived from a distinct data silo that may be provided via a separate communication channel to confirm that the user is who he or she purports to be. The present disclosure thus provides improved information security for secure systems by disclosing improved authentication methods and determining an authorized user with a high degree of confidence.

SUMMARY

In the following description, certain aspects and embodiments of the present disclosure will become evident. It should be understood that the disclosure, in its broadest sense, could be practiced without having one or more features of these aspects and embodiments. It should also be understood that these aspects and embodiments are merely exemplary.

The disclosed embodiments address disadvantages of existing systems by providing new and improved systems and methods for multi-factor authentication requiring evidence derived from or associated with a vehicle and the user. To provide these improvements, the disclosed systems and methods may be implemented using a combination of hardware, firmware, and/or software, as well as specialized hardware, firmware, and/or software, such as a machine constructed and/or programmed specifically for performing functions associated with the disclosed method steps. However, in some embodiments, disclosed systems and methods may be implemented instead by dedicated hardware.

Certain disclosed embodiments provide systems for multi-factor authentication, comprising one or more memory devices storing instructions and one or more processors configured to execute the instructions to perform operations. The operations may comprise receiving a request to authenticate a user of a mobile device attempting to use an application, the request comprising credential information associated with the user and vehicle data. The operations may further comprise determining the vehicle data was obtained from a vehicle via the mobile device, comparing the received vehicle data to stored user vehicle data, comparing the received credential information to stored user data, determining the received vehicle data matches the stored user vehicle data and the received credential information matches the stored user data, and responding to the received request by transmitting a notification that the user has been authenticated.

Other disclosed embodiments provide systems for multi-factor authentication, comprising one or more memory devices storing instructions and one or more processors configured to execute the instructions to perform operations. The operations may comprise prompting a user of a mobile device attempting to use an application for credential information. The operations may further comprise receiving credential information from the user, determining the mobile device is linked to a vehicle, receiving vehicle data from the linked vehicle via the mobile device, comparing the received vehicle data to user vehicle data, comparing the received credential information to user data, determining the received vehicle data matches the user vehicle data and the received credential information matches the user data, and authenticating the user by granting the use of the application.

Other disclosed embodiments provide computer-implemented methods of granting access using multi-factor authentication. The methods may comprise receiving a request to authenticate a user of a mobile device, determining the mobile device is linked to a vehicle over a wireless link, receiving credential information associated with the user, receiving vehicle data from the linked vehicle obtained over the wireless link, receiving user vehicle data, comparing the received vehicle data to received user vehicle data, comparing the received credential information to stored user data, determining the received vehicle data matches the received user vehicle data and the received credential information matches the stored user data, and determining the user is authentic by responding to the received request and granting access.

Still further disclosed embodiments provide computer-implemented methods of granting access using multi-factor authentication. The methods may comprise receiving, over a network, a request to authenticate a user of a mobile device, determining the mobile device is linked to a vehicle over a wireless link, receiving credential information associated with the user, receiving, from the linked vehicle over the network, vehicle data, comparing the received vehicle data to user vehicle data, comparing the received credential information to user data, determining the received vehicle data matches the user vehicle data and the received credential information matches the user data, and determining the user is authentic by responding to the received request, over the network, and granting access.

Aspects of the disclosed embodiments may also include a tangible, non-transitory, computer-readable medium that stores software instructions that, when executed by one or more processors, are configured for and capable of performing and executing one or more of the methods, operations, and the like consistent with the disclosed embodiments.

It is to be understood that both the foregoing general description and the following detailed description are exemplary and explanatory only, and are not restrictive of the disclosed embodiments as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
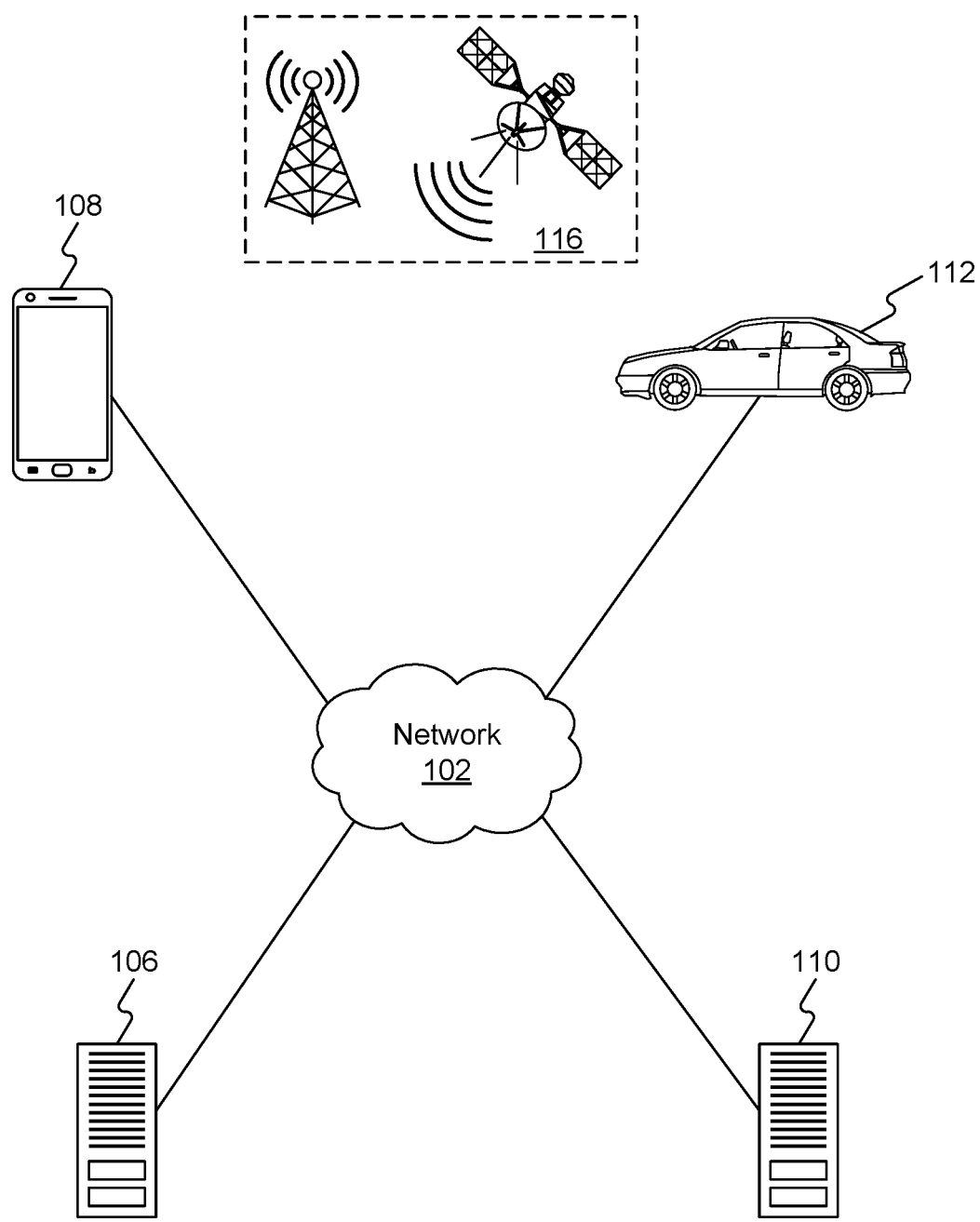
FIG. 1 is a block diagram of an exemplary system environment, consistent with disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

The disclosed embodiments generally relate to systems and methods for multi-factor authentication using data derived from or associated with a vehicle. Vehicle data may be provided during a login process, wherein the vehicle data may comprise data received from a vehicle during the login process and provided by the user (or vehicle), evidence of a communication link between the user device and a vehicle associated with a vehicle, and/or location data associated with the vehicle and a user device. The vehicle data may be verified by an authenticating system and/or authenticated via a third-party system in communication with the authenticating system. The vehicle data may be provided directly to the authenticating system from a vehicle system and/or via a user device once received from the vehicle. The disclosed embodiments improve system security by providing a factor that is difficult to hack or otherwise acquire when a user attempts to gain access to a system during an authentication process.

FIG. 1 is a diagram illustrating exemplary system environment 100 in accordance with the disclosed embodiments. The components and arrangements shown in FIG. 1 are not intended to limit the disclosed embodiments, as the components used to implement the disclosed processes and features may vary. System environment 100 may include a network 102, authenticating system 106, third-party system 110, user device 108, and vehicle system 112. Network 102, authenticating system 106, and third-party system 110 may each comprise one or more computing devices or servers, databases, cloud services, and/or internal networks. Other components known to one of ordinary skill in the art may be included in system environment 100 to gather, process, transmit, receive, acquire, and provide information used in conjunction with the disclosed embodiments. In addition, system environment 100 may further include other components that perform or assist in the performance of one or more processes that are consistent with the disclosed embodiments.

In some embodiments, system environment 100 may include one or more networks 102. The one or more networks 102 may comprise any computer networking arrangement used to exchange data. For example, network 102 may be the Internet, a private data network, a virtual private network (VPN) using a public network, and/or other suitable connections that enable the components of system environment 100 to send and acquire information. Network 102 may also include a public switched telephone network ("PSTN") and/or a wireless network such as a cellular network, wired Wide Area Network, Wi-Fi network, and/or another known wireless network (e.g., WiMAX) capable of bidirectional data transmission.

The network 102, authenticating system 106, and third-party system 110 may also include one or more local networks. A local network may be used to connect the components of FIG. 1, such as user device 108 to vehicle system 112, and user device 108 to authenticating system 106. A local network may comprise any type of computer networking arrangement used to exchange data in a localized area, such as wired Ethernet, wireless Wi-Fi based on IEEE 802.11 standards, Bluetooth™, and/or other suitable network protocols that enable components of system environment 100 and other servers, computers, and/or components of system environment 100 to interact with one another and to connect to network 102. In some embodiments, a local network comprises a portion of network 102. In some embodiments, a local network may comprise a network between two or more components of system 100, but separate from other components of system 100. In still other embodiments, components of system environment 100 may communicate via network 102 without a local network.

System 100 may further include navigation system 116 that may be configured to provide geographic position data to one or more of the components of system 100. Navigation system 116 may include a Global Navigation Satellite System (GNSS), a land-based cellular network, a local laser tracking system, or any other type of positioning device or system that may monitor movements of one or more components of system 100 and generate signals indicative of position. The position signals related to the one or more components of system 100 may be provided to the component being tracked, or alternatively may be provided to another component of system 100 requiring position data. For example, position data for both vehicle system 112 and user device 108 may be provided to user device 108, which data in turn may be provided to other components of system 100, including authenticating system 106 and/or third-party system 110. Alternatively, position data for vehicle system 112 and/or user device 108 may be sent directly to authenticating system 106 and/or third-party system 110. In addition, position data may be sent over network 102 and/or one or more local networks.

In some embodiments, system environment 100 may include one or more user devices 108. User device 108 may be one or more of a desktop computer, a laptop, a tablet, a smartphone, a multifunctional watch, a pair of multifunctional glasses, a tracking device, or any suitable device with computing capability. User device 108 may comprise one or more memories, one or more processors, and/or other specialized hardware that may be configured to execute one or more methods of the disclosed embodiments. User device 108 may have an application installed thereon, which may enable user device 108 to communicate with, for example, vehicle system 112, authenticating system 106 and/or third-party system 110 via network 102 and/or a local network. Additionally, user device 108 may connect to authenticating system 106, vehicle system 112, and/or third-party system 110 through use of web browser software via network 102 and/or a local network. In some exemplary embodiments, user device 108 may provide a graphical user interface to enable users to view data from the user device 108 generated by an application thereon and obtained over network 102 or local network from one or more of the components of system 100.

In some embodiments, one or more of authenticating system 106, third-party system 110, and/or network 102 may include one or more databases. A database may include one or more memory devices that store information. By way of example, databases may include Oracle™ databases, Sybase™ databases, or other relational databases or non-relational databases, such as Hadoop sequence files, HBase™, or Cassandra™. The databases or other files may include, for example, data and information related to the source and destination of a network request, the data contained in the request, etc. Systems and methods of disclosed embodiments, however, are not limited to separate databases. Database may include computing components (e.g., database management system, database server, etc.) configured to acquire and process requests for data stored in memory devices of database and to provide data from database.

In some embodiments, one or more of authenticating system 106, third-party system 110, and/or network 102 may include one or more cloud services. A cloud service may include a physical and/or virtual storage system associated with cloud storage for storing data and providing access to data via a public network such as the Internet. Exemplary cloud services may include cloud services offered by, for example, Amazon®, Apple®, Cisco®, Citrix®, IBM®, Joyent®, Google®, Microsoft®, Rackspace®, Salesforce.com®, and Verizon®/Terremark®, or other types of cloud services accessible via network 102. In some embodiments, cloud service comprises multiple computer systems spanning multiple locations and having multiple databases or multiple geographic locations associated with a single or multiple cloud storage service(s). As used herein, cloud service refers to physical and virtual infrastructure associated with a cloud storage service and may manage and/or store data.

In some embodiments, one or more of authenticating system 106, third-party system 110, and/or network 102 may include one or more servers or clusters of servers. Servers or clusters of servers may be located in the same data center or different physical locations. Multiple servers and clusters may be formed as a grid to share resources and workloads. Each server and/or cluster may include a plurality of linked nodes operating collaboratively to run various applications, software modules, analytical modules, rule engines, etc. Each node may be implemented using a variety of different equipment, such as a supercomputer, personal computer, a server, a mainframe, a mobile device, or the like. In some embodiments, the number of servers and/or server clusters may be expanded or reduced based on workload. In some embodiments, one or more components of system environment 100 may be placed behind a load balancer to support high availability and ensure real-time (or near real-time) processing.

In some embodiments, one or more of authenticating system 106, third-party system 110, and/or network 102 may include one or more computing systems that are configured to execute software instructions stored on one or more memory devices to perform one or more operations consistent with disclosed embodiments. For example, authenticating system 106 may include memory devices storing data and software instructions and processors configured to use the data and execute the software instructions to perform server-based functions and operations known to those skilled in the art. Authenticating system 106 may also include one or more general-purpose computers, mainframe computers, or any combination of these types of components. In some embodiments, authenticating system 106 may have an application installed thereon to perform processes that are consistent with disclosed embodiments.

In some embodiments, one or more of authenticating system 106, third-party system 110, and/or network 102 may include devices configured as a particular apparatus, system, or the like based on the storage, execution, and/or implementation of the software instructions that perform operations consistent with disclosed embodiments. Devices of authenticating system 106 may be standalone, or may be part of a subsystem included in a larger system. For example, authenticating system 106 may include distributed servers that are remotely located and communicate over a network (e.g., WAN and/or a local network) or a dedicated network.

In some embodiments, one or more of authenticating system 106, third-party system 110, and/or network 102 may include or may access one or more storage devices configured to store data and/or software instructions used by one or more processors to perform operations consistent with disclosed embodiments. For example, authenticating system 106 may include memory configured to store one or more software programs that perform several functions when executed by a processor. The disclosed embodiments are not limited to separate programs or computers configured to perform dedicated tasks. For example, authenticating system 106 may include memory that stores a single program or multiple programs. Additionally, one or more of authenticating system 106, third-party system 110, and/or network 102 may execute one or more programs located remotely. For example, authenticating system 106 may access one or more remote programs stored in memory included with a remote component that, when executed, perform operations consistent with disclosed embodiments. For example, authenticating system 106 may exchange data and interact with systems, devices, and programs of third-party system 110 and/or hardware and software of user device 108. In certain aspects, one or more of authenticating system 106, third-party system 110, and/or network 102 may include server software that generates, maintains, and provides services associated with authenticating a user.

Authenticating system 106 in system environment 100 may include any system or entity that user device 108 may be requesting access to, and/or any system that authenticates or facilitates authentication of a user of user device 108. Authentication may occur when a user of user device 108 attempts to request access to data from or log in to authenticating system 106. Authenticating system 106 may include any entity that may store, relay, or otherwise communicate or provide access to data upon request from user device 108. For example, authenticating system 106 may authenticate users of a particular application (e.g. stand alone program or smart phone application) of user device 108 during a login process. Authenticating system 106 may be a private entity, such as a bank, a retail entity such as a retail goods store, or a government entity (e.g. department, agency, etc.) that restricts access to data and programs to particular users. Authenticating system 106 may authenticate a user alone or in combination with the other components of system 100. In some embodiments, authenticating system 106 may coordinate with third-party system 110 to authenticate a user of user device 108.

Third-party system 110 may be any company, organization, or entity that may coordinate, control access, and/or provide information to different components of system 100. Third-party system 110 may communicate with one or more authenticating systems 106 and users via one or more user devices 108, and enable access to information necessary to authenticate the user of user device 108. Third-party system 110 may receive requests for data associated with a user, user device 108, and/or vehicle system 112, in order to assist authenticating system 106 to authenticate the user of user device 108. For example, vehicle data received from vehicle system 112 and/or user device 108 by authenticating system 106 may include data related to a vehicle and/or user. Third-party system 110 may include a database of vehicle data associated with users, including driving data, vehicle title data, vehicle registration data, vehicle and user insurance data, and/or any other data associated with the user and a vehicle of vehicle system 112. Third-party system 110 may be a public database, such as one maintained by a government entity (e.g. department of motor vehicles), or third-party system 110 may be a private database maintained by a private entity. Third-party system 110 may securely publish data to authenticating system 106 for authenticating system 106 to verify vehicle data provided to authenticating system 106 when authenticating users. Vehicle and user data may be shared over network 102 using a secure protocol (e.g., Transport Layer Security (TLS), Secure Sockets Layer (SSL), Security Hypertext Transfer Protocol (HTTPS), Secure File Transfer Protocol (SFTP), etc.) in a public or private network, and third-party system 110 may control access to the information. Data may be shared between third-party system 110 and authenticating system 106 via an application programming interface (API) or some other interface such as a web application, web site, etc. Authenticating system 106 and/or one or more third-party system 110 may host a web application, API, web site, or similar interface that is accessible over network 102. The interface may be hosted on one or more web servers and operate in a client-server model such that components of system 100 may share data.

Figure 2:
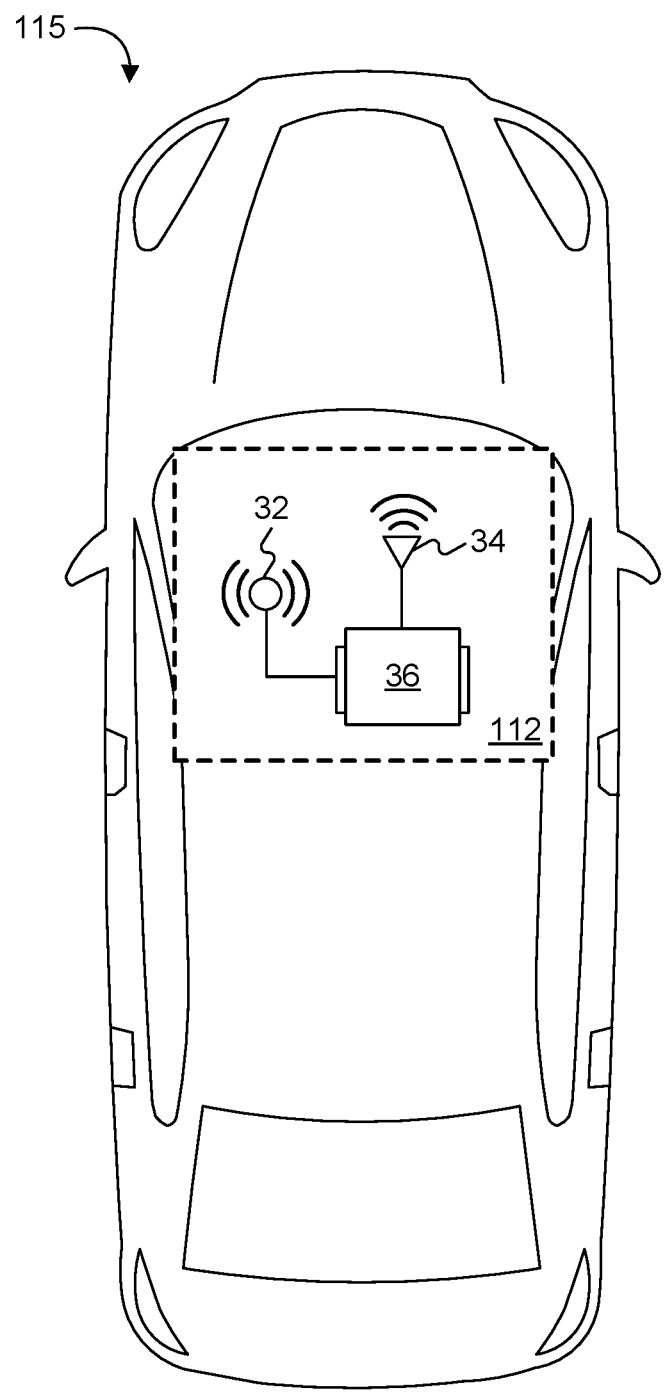
FIG. 2 is a block diagram of an exemplary vehicle system.

FIG. 2 provides an exemplary vehicle system 112 of the present disclosure. Vehicle system 112 forms a part of vehicle 115 or is otherwise associated with vehicle 115. Vehicle system 112 may include, among other things, a location determination device 32, a communication device 34, and a controller 36. Each of the components of vehicle system 112 may be communicatively coupled one another. In particular, controller 36 may receive signals from location determination device 32 and/or communication device 34 and vice versa. Controller 36 may include one or more processors, field programmable gate arrays (FPGAs), and/or digital signal processors (DSPs) for sending and receiving signals related to the operation of a vehicle and components of vehicle system 112. Controller 36 may also process data for the vehicle and facilitate communication with other onboard modules and/or devices outside of vehicle system 100. In certain embodiments, controller 36 may be the electronic control unit (ECU) of vehicle 115. In other embodiments, controller 36 may be a separate processor from the ECU of vehicle 115. Vehicle system 112 may further comprise memory and storage for storing data processed and maintained by vehicle system 112. In one embodiment, vehicle system 112 may be a separate device that is configured to couple to vehicle 115, such as a self-contained fob or device that may connect to an onboard diagnostic port (OBDII) and communicate with vehicle 115 and user device 108. In this embodiment, a user may secure vehicle system 112 to vehicle 115 and communicate with vehicle system 112 during an authentication process.

Location determination device 32 of vehicle system 112 may be configured to determine a position of vehicle system 112 and vehicle 115, and generate a signal indicative thereof. Location determination device 32 may embody, for example, a Global Positioning System (GPS) device, an Inertial Reference Unit (IRU), a local tracking system, or any other known locating device that receives or determines positional information. Location determination device 32 may be configured to convey a signal indicative of the received or determined positional information to controller 36 for processing.

Vehicle system 112 may further include a local network to facilitate communication between components of vehicle system 112. In one embodiment, data may be communicated within vehicle system 112 via a direct data link that may include wired connections. These may include an Ethernet connection, a connected area network (CAN), or other wired data link known in the art. Wireless communication may also be utilized for communication between components of vehicle system 112.

Communication device 34 of vehicle system 112 may include hardware and/or software that enables sending and receiving of data messages over a network 102 or over a local network. In some embodiments, communication device 34 may be a transceiver configured to send and receive data over network 102, which may include one or more local networks or wide area networks. In one embodiment, communication device 34 may communicate using Ethernet, Wi-Fi based on IEEE 802.11 standards, and/or Bluetooth™ protocols. In other embodiments, communication device 34 may communicate over cellular or satellite-based networks. In particular embodiments, communication device 34 may be configured to communicate over a local wireless network, such as Bluetooth®, with user device 108 in order to provide vehicle data and position data from vehicle system 112 to user device 108. Vehicle data and position data may also be sent to authentication system 106 by communication device 34.

Figure 3:
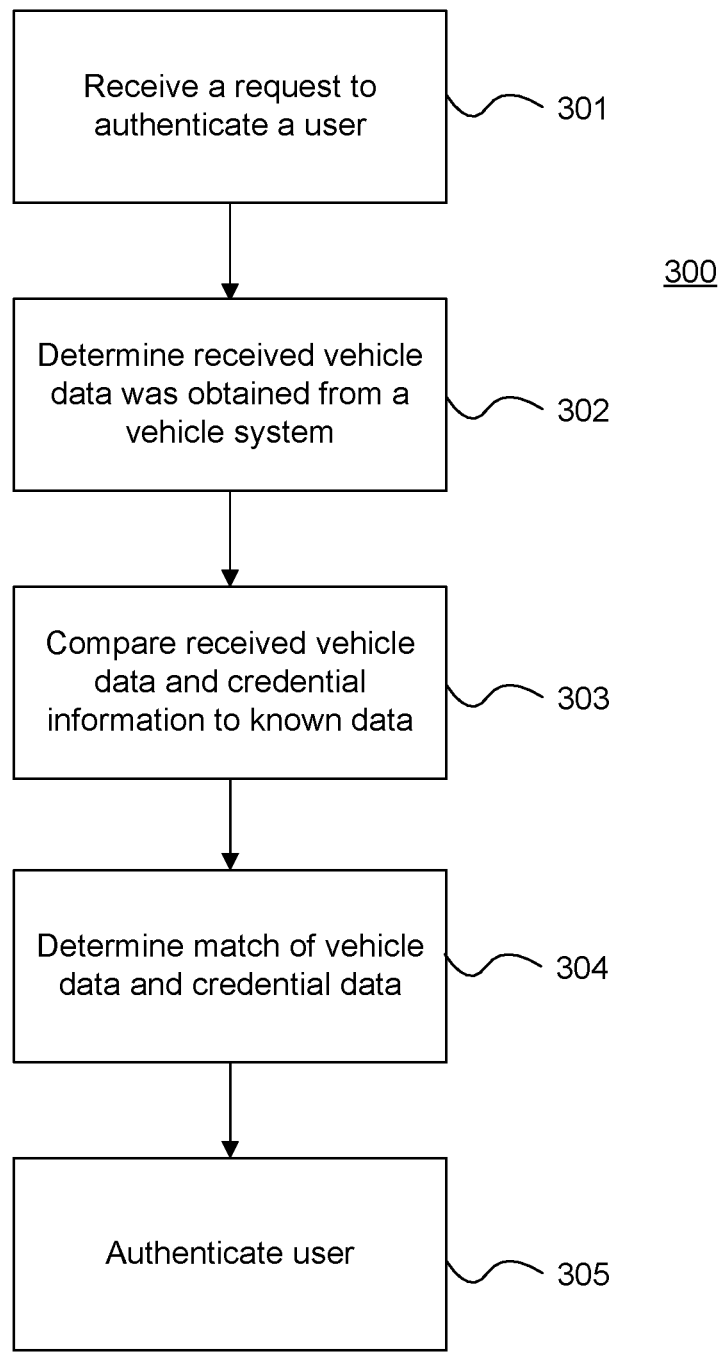
FIG. 3 is a flow chart of an exemplary method of multi-factor authentication of a user using vehicle data and credential data.

FIG. 3 provides a flow chart illustrating an embodiment of the disclosed authentication process 300 using multi-factor authentication. At step 301, a request may be sent from user device 108 to authenticating system 106 via network 102 to authenticate a user of user device 108. The request may be generated by an application (e.g. program) of user device 108 and sent over network 102 to authenticating system 106. The request may be generated when a user requests to log into an application on user device 108, requests data from a system or device over network 102 (e.g., from authenticating system 106 or other system/device), or requests to gain access to a program by logging into authenticating system 106. The generated authentication request may comprise credential information from the user and vehicle data. In certain embodiments, an application of user device 108 may prompt a user for credential information necessary to generate the authentication request. An active, secure link between user device 108 and vehicle system 112 may also be required to generate the authentication request.

Credential information may be one factor used by authenticating system 106 to authenticate and verify the user, and may include any known authentication factor. This may include a username and password, a fingerprint scan, a facial recognition scan, passphrase, or any other factor known in the art. Vehicle data may include data received from or associated with vehicle system 115. Vehicle data may include data associated with vehicle system 115 received by user device 108 and included in the authentication request. Vehicle data may also include data received by authenticating system 106 directly from vehicle system 112. Vehicle data may comprise information about the vehicle and the user of the vehicle, registration information, title information, driving history or driving characteristic data recorded by vehicle system 112, location data of vehicle system 112, or evidence of a network connection between vehicle system 112 and user device 108 at the time when the authentication request was generated. Vehicle data may also comprise any biometric driver data (e.g., driving history data) generated, recorded, or sensed by vehicle system 112 that reflects characteristics of a user's driving habits of vehicle 115. This may include any recorded or average user inputs to the controls of vehicle 115, such as accelerator pedal behavior, steering behavior, and average speed and acceleration. This may also include common distances and/or routes driven by the user of vehicle 115 recorded by vehicle system 112, or any other type of user-specific driving data stored by vehicle system 112 and associated with the user.

A network connection between user device 108 and vehicle system 112 may include a local network connection such as Bluetooth® or equivalent short-range radio link, evidenced by a secure wireless link between user device 108 and vehicle system 112. The link may be evidenced by timestamped and encrypted data using a public-private key arrangement, whereby authenticating system 106 may verify that user device 108 was connected to vehicle system 112 when the authentication request was generated by user device 108. For local network connections, a connection between user device 108 and vehicle system 112 ensures that the user of user device 108 is in proximity to and in communication with a vehicle 115 associated a user of user device 108. Authenticating system 106 may receive confirmation of a secure network connection between user device 108 and vehicle system 112 from user device 108, or directly from vehicle system 112.

Moreover, authenticating system 106 may also receive location information from user device 108 and vehicle system 112. Location information of user device 108 and vehicle system 112 may be provided together by user device 108, or location of user device 108 may be provided by user device 108 and location of vehicle system 112 may be provided by vehicle system 112 in a separate communication channel to authenticating system 106.

At step 302, authenticating system 106 may determine that the received vehicle data was obtained from vehicle system 112. This step determines whether the received vehicle data, whether received via user device 108 in the authentication request or directly from vehicle system 112, was actually generated and received from vehicle system 112 and not another system. Ensuring vehicle data is generated by and/or from vehicle system 112 and not another system reduces hacking and granting authentication based on false data. Verifying vehicle data is generated and/or received from vehicle system 112 may be accomplished through any number of known encryption-decryption methods that prevents the data from being intercepted or forged, including public-private key cryptography, wherein the vehicle data is encrypted using a public key that authentication system 106 can decrypt once received using a private key. Other encryption-decryption methods are also contemplated. Markers in the encrypted data may be used to determine when, where, and by what system the vehicle data was generated. This step may also include verifying that user device 108 was connected to (e.g., linked to) vehicle system 112 when user device 108 received the vehicle data that was sent to authenticating system 106. For example, evidence of an encrypted communication channel between user device 108 and vehicle system 112 may be verified upon receipt of the vehicle data if the vehicle data is sent from user device 108 and not directly from vehicle system 112. For example, authenticating system 106 may receive encrypted markers of a link between vehicle system 112 and user device 108 evidencing user device 108 was paired with the vehicle system 112.

At step 303, the received vehicle data and the credential information may be authenticated by comparing the data to known data and determining whether the user is how he or she purports to be. In some embodiments, authenticating system 106 may perform some or all of the comparing and determining operations. In other embodiments, authenticating system 106 may coordinate with third-party system 110 for these operations. This step involves determining whether the factors provided by the user and/or vehicle system 112 are valid before the user is authenticated.

With respect to the received credential information, the credential information is analyzed and compared to known credential information of the user in order to determine if the data matches. For example, a received username and password may be compared to a stored username and password to determine if there is a match. Similar processes may be accomplished for alternative credential information, including biometric data (e.g., fingerprint data, facial scan data, voice data, etc.). The received credential information may first be scanned in order to transform the received data into other data that can be compared to stored information. For example, a voice sample may be analyzed and compared to a known voice sample during this step. In any embodiment of the received credential information, authenticating system 106 may receive and process the data independently, or authenticating system 106 may send signals to third-party system 110 to request assistance in comparing data to authenticate the received credential information.

The received vehicle data may be also processed by comparing it to known vehicle data to determine if there is a match. Vehicle data may include, among other things, data related to vehicle 115, data related to the user's use of vehicle 115, or data related to user's ownership of vehicle 115. In certain embodiments, authenticating system 106 may compare the received vehicle data to stored vehicle data associated with the user and vehicle 115. The user may have registered vehicle 115 with authenticating system 106, after which data associated with vehicle 115 may be stored for use in future comparisons. The stored vehicle data may include data about vehicle 115 (e.g., make and model), mileage of vehicle 115, driving behavior data of vehicle 115 associated with the user's use of vehicle 115, or any other stored data related to vehicle 115, vehicle system 112, and/or the user's use of vehicle 115. Authenticating system 106 may also send a request to third-party system 110 to compare the received vehicle data to stored vehicle data associated with the user (e.g., stored user vehicle data). The stored data of third-party system 110 may include data associated with vehicle ownership (e.g., title information, insurance information, registration information), driving behavior, or any other vehicle data, which may be related to vehicle 115, vehicle system 112, and/or the user's use of vehicle 115, and that may be stored remotely. Third-party system 112 may store this data in a database or otherwise access a database storing this information.

The vehicle data may also be verified in Step 303 by authenticating system 106 requesting the same vehicle data from both user device 108 and vehicle system 112 at the time of the authorization request, and comparing the two sets of data to one another. Authenticating system 106 may first establish a secure connection with vehicle system 112 over network 102 to request and receive a first set of vehicle data. Authenticating system 106 may then request the same vehicle data from user device 108 over network 102. Upon receipt of the requested vehicle data from user device 108, authenticating system 106 may compare the vehicle data received from user device 108 with the received vehicle data from vehicle system 112 to determine a match. In this way, authenticating system 106 can ensure user device 108 is connected to vehicle system 112 at a time of authentication by comparing two sets of data requested during authorization and received through different communication channels. This ensures user device 108 and vehicle system 112 are associated, and thus the vehicle data received from user device 108 was in fact received from vehicle system 112 and not a different system attempting to trick or hack authenticating system 106.

For embodiments of vehicle system 112 contained within a fob or device affixed to vehicle 115 (e.g., that may connect to an onboard diagnostic port (OBDII) and communicate with and user device 108), authenticating system 106 may also verify a physical or live connection between vehicle system 112 and vehicle 115 at the time of authentication. In this embodiment, vehicle system 112 is secured to vehicle 115 and authenticating system 106 send a request over network 102 for confirmation that vehicle system 112 is in communication with vehicle 115 before authenticating the user of user device 108. In addition (or in lieu of) requesting the same data from user device 108 and vehicle system 112, authenticating system 106 may verify user device 108 received the vehicle data it provided to authenticating system 106 from vehicle system 112 when vehicle system 112 was connected to vehicle 115, and verify when and what data was transmitted. In this way, authenticating system may independently verify user device 108 was in connection with vehicle system 112 when user device 108 received the vehicle data, that vehicle system 112 provided the vehicle data, it may be used to confirm the same vehicle data was provided to authenticating system 112 as was provided by vehicle system 112, and it may confirm vehicle system 112 is connected to a vehicle 115 associated with the user.

At step 304 authenticating system 106 may determine whether the received vehicle data matches stored user vehicle data and may determine whether the received credential information matches stored user data. Once a match is determined, authenticating system 106 may determine that the user has provided valid factors for authentication and may authenticate that the user is who he or she purports to be with a high degree of confidence. Once authenticated, authentication system 106 may grant access to user device 108 and may respond to the received authentication request by transmitting a notification at Step 305 that the user has been authenticated.

Access may include providing requested data over network 102 to user device 108. Access may also include providing access to programs on authentication system 106, third-party system 110, or any other system or device thereof or connected to network 102. Access may also include providing access to a program stored and executed on user device 108. The notification sent to user device 108 may include the requested data, further instructions for proceeding, or may include a signal triggering an application of user device 108 to execute certain operations.

In addition to matching credential data and vehicle data to authenticate a user, location data may also be utilized. In one embodiment, a location of vehicle system 112, vehicle 115, and user device 108 may be used to further verify the user during an authentication process. In order to, among other things, ensure the user is in proximity to vehicle system 115 and vehicle 112, and thus ensure data is being received from vehicle system 115, the location of all parties may be verified during authentication. For example, a location of vehicle system 115 and/or vehicle 112 may be sent to user device 108. The location data may be included in the authentication request sent to authenticating system 106. Location of vehicle system 115 and/or vehicle 112 may also be sent directly to authenticating system 106 over network 102 through a separate communication channel from the authentication request from user device 108. A location of user device 108 may also be sent to authenticating system with the authentication request. Authenticating system 106 may then compare the location of user device 108 to vehicle system 112 and vehicle 115 to determine whether they are in proximity to one another. Location of vehicle system 112 may be assumed to be the same as the location of vehicle 115, or additional checks may be completed to ensure vehicle system 112 is coupled to vehicle 115 when communication is established with one or more of user device 108 or authenticating system 106, or when data is received therefrom. If the location of user device is within a predetermined distance of vehicle system 112 and/or vehicle 115, authentication system 106 may then proceed to determine whether the credential information and vehicle data matches the respective stored data to grant access to the user. The order of operations described above may also be reversed in some embodiments.

In addition, authenticating system 106 may verify the authenticity of the received credential data and vehicle data by determining whether the received vehicle data was obtained from the vehicle at a time associated with the request and/or over a secure link with vehicle system 112. In order to ensure that data is not intercepted and later used in an unauthorized attempt to gain access, authenticating system 106 may require encrypted time-stamp information related to the vehicle data received from user device 108 and/or vehicle system 112. Authenticating system 106 may verify that the authentication request was generated within a predetermined time that the vehicle data was obtained from vehicle system 112, thus ensuring that user device 108 generated the authentication request while linked (or recently linked) to vehicle system 112. After the predetermined time period, the authentication request may timeout. In other words, in some embodiments authenticating system 106 may require the authentication request to be generated and received within a short period of time after the vehicle data was generated and/or sent to user device 108 (if sent from user device 108 to authenticating system 106) and/or authenticating system 106 (if sent directly to from vehicle system 112 to authenticating system 106).

In some embodiments, the vehicle data required to authenticate a user may not be a static type of data but may vary depending on the type requested by authenticating system 106. For instance, vehicle data may comprise a number of different types of data as described above. Authenticating system 106 may request different types of data at different times or upon different authentication attempts. For instance, authenticating system 106 may require driving history data and vehicle identification data at a first authentication attempt, and then request registration information and vehicle identification data at a second authentication attemptBy requesting different types of vehicle data, authenticating system adds variability to the authentication process and thus improve security. Therefore, variable vehicle data may be requested. In such a case, in certain embodiments an authentication request sent from user device 108 may cause authenticating system 106 to respond with a request for particular types of vehicle data that authenticating system 106 desires at that time for authentication, after which user device 108 may request and receive the desired vehicle data from vehicle system 112. User device 108 may then send the desired vehicle data to authenticating system 106 for authentication. In some embodiments, this request-response procedure for variable vehicle data may occur at Step 301 of FIG. 3.

The present disclosure provides an improved method of authenticating a user of a system that improves security. Multi-factor authentication using vehicle data as one factor may benefit a system for authenticating a user by providing a high degree of confidence that the user is who he or she purports to be. Vehicle data may be difficult to acquire or intercept, thereby reducing the likelihood that unauthorized users may hack and circumvent the system. Vehicles are generally in close proximity to users and, combined with encryption techniques and additional verification procedures (e.g., ensuring user device 108 and vehicle system 112 are in communication, ensuring the vehicle data was acquired at a time when authentication is requested, and/or ensuring that vehicle system 112 and user device 108 are within a proximity to one another) may provide an authentication factor that may be resistant to hacking. This in turn may significantly improve system security.

In some embodiments, some or all of the logic for the above-described techniques may be implemented as a computer program, as an application, or as a plug-in module or sub-component of another application. The described techniques may be varied and are not limited to the examples or descriptions provided. In some examples applications may be developed for download to mobile communications and computing systems, e.g., laptops, mobile computers, tablet computers, smartphones, etc., being made available for download by the customer either directly from the device or through a website.

Moreover, while illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified or combined, and/or steps may be added or deleted. Thus, the foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments.

The claims are to be interpreted broadly based on the language employed in the claims and not limited to examples described in the present specification. Accordingly, the examples presented herein are to be construed as non-exclusive. Further, the steps of the disclosed methods may be modified in any manner, including by reordering steps and/or inserting or deleting steps.

Furthermore, although aspects of the disclosed embodiments are described as being associated with data stored in memory and other tangible computer-readable storage media, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above-described examples but, instead, are defined by the appended claims in light of their full scope of equivalents.

What is claimed is:

1. A computer-implemented method of authenticating a user using multi-factor authentication, comprising:
    receiving a request to a vehicle system from a user device to authenticate a user;
    verifying, in response to the request, a live connection between a vehicle device and a vehicle;
    receiving vehicle data obtained over a wireless network connection from the user device, wherein the user device received an encrypted representation of the vehicle data using the verified live connection and in response to a request sent from the user device to the vehicle device;
    verifying that the user device received the vehicle data from the vehicle device during the live connection based on confirmation of a secure network connection;
    receiving external vehicle data stored, at a database, remotely from the vehicle, the user device, and the vehicle device;
    comparing the received vehicle data to the received external vehicle data;
    determining the received vehicle data matches the received external vehicle data; and
    authenticating the user device based on the determined match.

2. The method of claim 1, wherein the vehicle device is communicably connected to the vehicle.

3. The method of claim 1, wherein the live connection is a connection between the vehicle device and a physical port of the vehicle.

4. The method of claim 1, wherein the vehicle data from the user device comprises at least one of: driving history data, vehicle registration information, or vehicle identification information.

5. The method of claim 1, wherein the vehicle data from the user device comprises biometric driver data associated with the vehicle, including at least one of: accelerator pedal behavior data, steering behavior data, speed data, acceleration data, common distance data, or common route data.

6. The method of claim 5, wherein the vehicle data from the user device was generated, recorded, or sensed by the vehicle device.

7. The method of claim 1, wherein the vehicle data from the user device comprises vehicle location information determined by the vehicle device.

8. The method of claim 1, wherein the request includes user credential information.

9. The method of claim 7, further comprising:
    receiving a location of the user device; and
    comparing the received user device location to the vehicle location information.

10. The method of claim 1, wherein the vehicle device is configured to communicate over a wireless communications path with the user device.

11. The method of claim 10, wherein the vehicle device is configured to communication over the wireless communications path using a Wi-Fi or Bluetooth™ connection.

12. The method of claim 1, wherein the request from the user device was generated in response to a secure link existing between the user device and the vehicle device.

13. The method of claim 1, wherein the received vehicle data is encrypted, and the method further comprises decrypting the received vehicle data prior to the comparing.

14. A vehicle-connectable device distinct from a vehicle, for authenticating a user using multi-factor authentication, comprising:
    one or more memory unit storing instructions; and
    one or more processors that execute the instructions to perform operations comprising:
    storing vehicle data;
    establishing a communication connection with a mobile device separate from the vehicle-connectable device;
    receiving, from the mobile device, a request related to the vehicle data; and
    transmitting an encrypted representation of a subset of the vehicle data to the mobile device as a response to the request, wherein transmitting the encrypted representation of the subset of the vehicle data comprises:
        in response to the request being a first authentication attempt, transmitting a first encrypted representation of a first subset of the vehicle data to the mobile device; and
        in response to the request being a second authentication attempt different from the first authentication attempt, transmitting a second encrypted representation of a second subset of the vehicle data to the mobile device, the second subset of the vehicle data being different from the first subset of the vehicle data.

15. The vehicle-connectable device of claim 14, wherein the stored vehicle data comprises vehicle registration information or vehicle title information, and
    wherein a representation of the vehicle registration information is transmitted to the mobile device in response to the request being the second authentication attempt in lieu of the first authentication attempt.

16. The vehicle-connectable device of claim 14, wherein the stored vehicle data comprises vehicle registration information or vehicle title information, and
    wherein a representation of the vehicle title information is transmitted to the mobile device in response to the request being the second authentication attempt in lieu of the first authentication attempt.

17. The vehicle-connectable device of claim 14, wherein the vehicle-connectable device is a self-contained fob configured to connect to a port of the vehicle.

18. The vehicle-connectable device of claim 14, wherein the stored vehicle data comprises biometric driver data generated by the vehicle-connectable device and associated with the vehicle, including at least one of: accelerator pedal behavior data, steering behavior data, speed data, acceleration data, common distance data, or common route data.

19. The vehicle-connectable device of claim 14, wherein the stored vehicle data comprises evidence of a network connection between the vehicle-connectable device and the mobile device at a time when the mobile device generated an authentication request.

20. A non-transitory, computer-readable medium comprising instructions that, when executed by one or more processors, cause operations comprising:
    receiving a request to a vehicle system from a user device to authenticate a user;
    verifying, in response to the request, a live connection between a vehicle device and a vehicle;
    receiving vehicle data obtained over a wireless network connection from the user device, wherein an encrypted representation of the vehicle data was received by the user device using the verified live connection in response to a request sent from the user device to the vehicle device;

verifying that the user device received the vehicle data from the vehicle device during the live connection based on confirmation of a secure network connection;
receiving external vehicle data stored, at a database, remotely from the vehicle, the user device, and the vehicle device;
comparing the received vehicle data to the received external vehicle data;
determining that the received vehicle data matches the received external vehicle data; and
authenticating the user device based on the determined match.

\* \* \* \* \*